United States Patent [19]

Bäbler et al.

[11] Patent Number: 5,194,088
[45] Date of Patent: Mar. 16, 1993

[54] PROCESS FOR CONDITIONING ORGANIC PIGMENTS

[75] Inventors: Fridolin Bäbler, Hockessin; Edward E. Jaffe, Wilmington, both of Del.

[73] Assignee: Ciba-Geigy Corporation, Ardsley, N.Y.

[21] Appl. No.: 726,612

[22] Filed: Jul. 8, 1991

[51] Int. Cl.$^5$ ................. C09B 56/00; C09B 48/00; C09B 7/00
[52] U.S. Cl. ................. 106/412; 106/22 H; 106/23 K; 106/410; 106/411; 106/413; 106/493; 106/494; 106/495; 106/497; 106/498; 106/500; 546/36; 546/49; 546/56; 546/167; 546/256; 546/272; 548/453
[58] Field of Search ............ 546/49, 56, 36, 167, 546/256, 272; 106/20, 22, 23, 412, 494, 495, 497, 498, 500, 410, 411, 413, 493; 548/453

[56] References Cited

U.S. PATENT DOCUMENTS

| | | | |
|---|---|---|---|
| 2,844,485 | 7/1958 | Struve | 546/49 |
| 3,298,847 | 8/1965 | Hanke et al. | 546/57 |
| 3,607,336 | 9/1971 | Jaffe | 106/495 |
| 4,247,696 | 1/1981 | Shibata et al. | 546/49 |
| 4,579,949 | 4/1986 | Rochat et al. | 546/167 |
| 4,720,305 | 1/1988 | Iqbal et al. | 106/494 |
| 4,760,144 | 7/1988 | Jaffe | 546/49 |
| 4,895,948 | 1/1990 | Jaffe et al. | 546/56 |

OTHER PUBLICATIONS

Derwent Abst. 79-83541B/46 (JP 54130-621).

Primary Examiner—Mark L. Bell
Assistant Examiner—Scott L. Hertzog
Attorney, Agent, or Firm—Marla J. Mathias; Harry Falber

[57] ABSTRACT

A process for converting crude pigments into pigmentary form wherein the crude pigment is premilled, then contacted with a polar solvent at temperatures below 50° C., with or without the presence of particle growth inhibitors, and finally isolated.

14 Claims, No Drawings

PROCESS FOR CONDITIONING ORGANIC PIGMENTS

The synthesis of organic pigments generally produces a product in coarse crystalline form, which necessarily must be subjected to an after-treatment or so-called "conditioning" in order that the pigment can be appropriately utilized. A host of conditioning methods are known in pigment technology. Usually they take the form of thermal after-treatments in the presence of organic solvents or grinding procedures with suitable grinding agents in the presence or absence of organic solvents. For example, U.S. Pat. No. 2,844,485 discloses the salt milling of a quinacridone pigment in the presence of an organic liquid, while U.S. Pat. Nos. 4,895,948 and 4,760,144 disclose conditioning processes involving milling of quinacridone in an alcohol-base medium.

Conditioning processes in which crude organic pigments are precipitated from a solvent-base medium are described in JP 54130-621 or from sulfuric acid are described in U.S. Pat. No. 3,607,336.

U.S. Pat. No. 3,298,847 discloses a method for the preparation of solid solutions of quinacridone pigments by contacting a mixture of quinacridone compounds with a polar organic liquid in the presence of a strong base whereby, in a preferred procedure, the mixture of the organic liquid, the base and the quinacridone compounds is heated to reflux and maintained at reflux for several hours.

U.S. Pat. No. 4,247,696 describes a process of converting crude quinacridone to finely divided gamma crystal phase quinacridone pigment by dissolving the crude in dimethylsulfoxide in the presence of caustic alkali and water and then adding a mineral acid or a mixture thereof with a diluent to precipitate the desired product.

U.S. Pat. No. 4,579,949 provides a procedure for obtaining a more opaque pigment form by heating diketopyrrolopyrrole pigments in water or an organic solvent. U.S. Pat. No. 4,720,305 teaches heat treatment of a diketopyrrolopyrrole pigment-water or organic solvent mixture (preferably above 80° C.) and subsequent comminution, such as wet grinding, in order to prepare transparent pigment forms.

It has now been surprisingly determined that by contacting certain premilled crude pigments with highly polar solvents at temperatures below 50° C. without the need for acid or base or additional milling of any kind, excellent pigmentary forms are obtained. The surprising ability to directly utilize the premilled crude pigment is most beneficial in terms of performance and economic advantage.

Thus, the present invention relates to a process for converting premilled crude organic pigments to pigmentary form by contacting the premilled crude with a highly polar solvent at temperatures below 50° C., preferably between 10° to 40° C.

The highly polar solvents which are suitable for use in the process of this invention include N,N-dimethylformamide, N,N-dimethylacetamide, N,N,N',N'-tetramethyl-urea, N-methylpyrrolidone, N-methylformamide, tetramethylene sulfone and dimethyl sulfoxide N,N-dimethylformamide and dimethylsulfoxide are preferred, with dimethylsulfoxide being most preferred.

Organic pigments which can be conditioned by the process of this invention include diketopyrrolopyrroles, perylenes, unsubstituted quinacridone, substituted quinacridones such as 2,9-dichloroquinacridone, 2,9 dimethylquinacridone and 4,11-dichloroquinacridone, phthalocyanines, perinones, isoindolinones, indanthrone, dioxazines, anthraquinones, isoindolines, flavanthrones, pyranthrones, thioindigos and solid solutions containing two or more of these pigment moieties, as well as azo-pigments. The process of this invention is particularly suitable for conditioning unsubstituted and substituted quinacridones, diketopyrrolopyrroles, quinacridone solid solutions, quinacridone/diketopyrrolopyrrole solid solutions, anthraquinones, isoindolinones, dioxazines and azo pigments.

Examples of such pigments are C.I. Pigment Violet 19, C.I. Pigment Violet 42, C.I. Pigment Red 202, C.I. Pigment Red 254, C.I. Pigment Red 255, C.I. Pigment Yellow 110, C.I. Pigment Yellow 109, C.I. Pigment Orange 61, C.I. Pigment Blue 60, C.I. Pigment Yellow 128, C.I. Pigment Yellow 93, C.I. Pigment Violet 37, C.I. Pigment Violet 23, C.I. Pigment Blue 15:3, C.I. Pigment Red 179, C.I. Pigment Red 202.

Premilling as used in this invention refers to milling in the complete absence of liquids, or if liquids are used such as a phase directing solvent or a surface active agent, they are present in such small amounts (maximum of about 10% by weight of pigment) or of such a nature that the pigment retains the characteristics of a powder.

Premilling operations are known and can be accomplished in various ways. Thus, it is possible to premill with 12.7 mm steel balls and roofing nails, or to avoid metal attrition and the corresponding need for pigment extraction with dilute acid, premilling can be accomplished with 12.7 mm high density, high alumina ceramic balls or rods (Diamonite Products Manufacturing, Inc.). Ceramic beads of 1.6 to 2.5 mm size made from crystalline zirconia phase and amorphous silica phase by fusion of the oxides are particularly suitable (product of Quartz Products Corporation). Although a variety of sizes of grinding media can be used, the aforementioned sizes are preferred. Grinding apparatuses are known, a ball mill, or an attritor mill filled with metal or porcelain balls, preferably ceramic beads, being suitable.

In a preferred procedure, the pigment crude is premilled in the presence of 10-30% inorganic salt such as NaCl, CaCl$_2$, Na$_2$SO$_4$ or Al$_2$(SO$_4$)$_3$ with or without water of hydration. The preferred milling mixture composition is 75 to 85% crude and 15 and 25% anhydrous Na$_2$SO$_4$. The salt is primarily present to suppress the potential explositivity of the resulting millpowder.

The premilled pigment salt mixture is separated from the grinding media by sieving and is then suspended in the highly polar solvent. The suspension is stirred at a temperature below 50° C., preferably 10°-40° C. and most preferably at 20°-28° C. (room temperature) for 5 minutes to 20 hours, preferably 15 minutes to 9 hours, depending on the identity of the pigment and the desired pigmentary properties of the ultimate product. The highly polar solvent is generally present in an amount ranging from 5 to 20 times the weight of pigment, and preferably 8 to 15 times.

Contact of the premilled powder with the solvent causes the aggregated pigment powder to deaggregate and undergo particle ripening. Owing to the low temperature at which the solvent treatment is conducted, the ripening process can be easily controlled as a function of time. Depending on the specific solubility of a pigment in a given highly polar solvent, a more transparent (smaller particle size pigment <0.1 μm) or a more opaque (larger particle size pigment >0.1 μm) can be obtained.

Since the ultimate pigment particle size is generated during the solvent treatment, the pigment can be isolated directly by filtration, washing the presscake with water and/or organic solvents such as alcohols like methanol, ethanol, n-propanol or isopropanol, and drying.

Even though the particle size of the pigment can be controlled to a certain degree by varying the time and temperature of the treatment in the solvent system, a greater degree of desired particle size control for especially very small particle size pigment can be exercised by adding particle growth inhibitors such as sulfonic acid, phthalimidomethyl-, imidazolylmethyl-, pyrazolylmethyl-derivatives or dialkylaminoalkylsulfonamide derivatives of quinacridones or other similar derivatives of the corresponding pigments. Particle growth inhibitors, also known as antiflocculating agents, are well known and are described, for example, in U.S. Pat. Nos. 3,386,843, 4,310,359, 4,692,189, EP 321-397-A, EP 321-919-A and EP 362-690-A.

The particle growth inhibitors are added in amounts ranging from 0.05 to 15% preferably 1 to 8%, and most preferably 2 to 5% based on the weight of corresponding pigment. They can additionally serve to lessen or avoid flocculation, increase pigment dispersion stability and positively affect rheological characteristics of the pigments obtained according to the present invention.

As previously noted, the process according to the invention is also suited for preparing pigment solid solutions such, for example, as those described in U.S. Pat. Nos. 3,160,510, 4,783,540 and 4,810,304. Instead of a single pigment, the pigment mixture which will form the solid solution is premilled and the resulting premilled powder submitted to solvent treatment.

Depending on the end use, it can be advantageous to add specific amounts of texture improving agents to the pigment before or after conditioning, besides the addition of crystallization inhibitors. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/maleate resins or fumaric acid/colophonium resins or polymeric dispersants. The texture improving agents are preferably added in amounts of 0.1 to 30% by weight, most preferably of 2 to 15% by weight, based on the final product.

The compositions of this invention are suitable for use as pigments for coloring high molecular weight organic materials. Examples of high molecular weight organic materials which may be colored or pigmented with the compositions of this invention are cellulose ethers and esters such as ethyl cellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethans, polyesters, rubber casein, silicone and silicone resins, singly or in mixtures.

The above high molecular weight compounds may be used singly or as mixtures in the form of plastics, melts, spinning solutions, varnishes, paints or printing inks. Depending on the end use, it is advantageous to use the pigments as toners or in the form of preparations. The compositions of the invention are preferably employed in an amount of 0.1 to 30% by weight, based on the high molecular organic material to be pigmented.

Pigmentation of high molecular weight organic compounds with the compositions of the invention is carried out, for example, by incorporating such compositions, optionally in the form of a masterbatch, into the substrates using roll mills, mixing or grinding machines. The pigmented material is then brought into the desired final form by methods which are known per se, for example, by calendaring, molding, extruding, coating, spinning, casting or by injection molding. It is often desirable to incorporate plasticizers into the high molecular compounds before processing in order to produce non-brittle moldings or to diminish their brittleness. Suitable plasticizers are, for example, esters of phosphoric acid, phthalic acid or sebacic acid. The plasticizers may be incorporated before or after working the composition into the polymers. To obtain different shades, it is also possible to add fillers or other chromophoric components such as white, colored or black pigments, in any amount, to the high molecular organic compounds, in addition to the composition of this invention.

For pigmenting varnishes and printing inks, the high molecular weight organic materials and the pigments obtained according to the invention, together with the optional additives such as fillers, other pigments, siccatives or plasticizers, are finely dispersed or dissolved in a common organic solvent or mixture of solvents. The procedure may be such that the individual components by themselves, or jointly, are dispersed or dissolved in the solvent and subsequently all the components are mixed.

The colorations obtained in plastics, filaments, varnishes or paints, have good all-around fastness properties such as good dispersibility, high tinting strength, good gloss and good fastness to overspraying, migration, heat, light and weathering.

The invention is illustrated by the following examples. In these examples, all parts given are by weight unless otherwise indicated.

EXAMPLE 1

A 1-SDG Attritor ™ mill manufactured by UNION Process, Inc., Akron, Ohio, is charged with 468 grams of crude 3,6-diphenyl-1,4-diketopyrrolo-[3,4-c]-pyrrole and 82.5 grams of anhydrous sodium sulfate. The mill is fitted with L-arms and charged with 3.78 liters of 0.6 cm diameter ceramic grinding media (64.2% $SiO_2$/26.7% $MgO$/5.8% $Al_2O_3$/1.2% $K_2O$/1.1% $Fe_2O_3$, 7.5 MOH hardness, 60–65 Rockwell 45N hardness, 3.0 kg/cm impact strength, 8500 kg/cm$^2$ compressive strength). The mill is then rotated at 500 RPM and, at the conclusion of the milling cycle, is recovered by opening the valve at the bottom of the mill while rotation continues for 15 minutes.

The premilling is controlled by assessing the width at half height of the 6.4°2Θ double glancing angle band in the X-ray diffraction pattern; the greater the width, the smaller the particle size of the premilled pigment powder.

A flask equipped with a stirrer and thermometer is charged with 1200 ml dimethylsulfoxide (DMSO) and 110 grams of the above described premil powder of 3,6-diphenyl-1,4-diketopyrrolo-(3,4,c)-pyrrole. The suspension is stirred for 45 minutes at 23° to 28° C. The pigment is isolated by filtration and the presscake washed with methanol (DMSO-free) followed by water until salt free and dried at 100° C. Yield: 90 grams of an orange pigment.

The pigmentary qualities are determined by rubout readings. Rubouts were prepared in lithographic varnish with a Hoover Muller. The apparatus is equipped with a ⅛ HP 110–220 V, 60 cycle motor and two glass plates. The muller can be adjusted to stop after 25, 50, 75, or 100 revolutions with 50 revolutions being considered normal. Three weights are used which apply 150 pounds pressure between the plates. In each case, 0.6 grams of dry pigment and 1.2 grams of a lithographic varnish drier are mixed with a spatula on the lower glass plate. The upper plate is locked to the lower plate, and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 grams) and a zinc oxide past dispersion (10 grams) are weighed accurately and mixed with a spatula on a polished glass plate. Any controls are prepared in an identical manner.

After incorporation in a paint system, the pigment shows great enhancement in masstone saturation and hiding compared to the starting material (see Example 17).

EXAMPLE 2

Example 1 is repeated except that 1200 ml N,N-dimethylformamide instead of dimethylsulfoxide is used as the highly polar solvent providing an orange pigment with correspondingly good pigment properties.

EXAMPLE 3

Example 1 is repeated except that 1200 ml N,N-dimethylacetamide instead of dimethylsulfoxide is used as the highly polar solvent providing an orange pigment with analogous pigment properties.

EXAMPLE 4

A ball mill having the capacity of about 1 liter containing 1.5 kg steel balls (diameter: 1.2 cm) is loaded with 50 grams crude indanthrone blue and 12.5 grams of anhydrous sodium sulfate. The sealed mill is rolled for 48 hours on a roller mill at room temperature. The mill powder is separated from the grinding media and 12 grams thereof are introduced into a 500 ml flask equipped with a stirrer and thermometer to which is added 150 ml dimethylsulfoxide with stirring. The blue suspension is stirred for 8 hours at room temperature and filtered. The presscake is washed with methanol and reslurried in 200 ml water. 1.5 ml concentrated sulfuric acid are added and the pigment suspension is stirred for 45 minutes at 70°-80° C. to remove any iron generated in the premilling. The pigment is filtered, the presscake washed until neutral with hot water and dried. The pigment exhibits higher color strength and saturation compared to the starting material, when incorporated into plastics, paints or varnish systems.

The coloristic properties of the resulting pigment are determined by rubout in comparison to a commercial indanthrone blue, IRGAZIN Blue A3RN (CIBA-GEIGY AG) treated in a similar manner as described in ASTM-method D-387-60 and incorporated in a lithographic varnish with a Hoover Muller as described in Example 1.

Using a color spectrophotometer with D-65 illuminant, C.I.E. lab scale and 10 degree observer with specular component included, the L,A,B color space values of masstone as well as tint rubouts are measured. In addition, the total color difference values (ΔE) are determined of the measured data from the pigment of Example 4 versus the data from IRGAZIN Blue A3RN.

|  | Masstone | | | | Tint | | | |
| --- | --- | --- | --- | --- | --- | --- | --- | --- |
|  | L | A | B | ΔE | L | A | B | ΔE |
| Example 4 | 24.2 | 1.5 | −2.5 | 0.2 | 52.0 | −2.2 | −31.9 | 1.6 |
| IRGAZIN Blue A3RN | 24.4 | 1.6 | −2.6 | — | 52.6 | −2.5 | −33.5 | — |

In comparison to IRGAZIN Blue A3RN, the pigment of Example 4 shows a slightly darker masstone and a bluer and stronger tint.

EXAMPLE 5

Example 4 is repeated, except that crude isoindolinone pigment (C.I. Pigment Yellow 109) is used instead of indanthrone blue and the premilled powder is stirred for 4 hours in dimethylsulfoxide at room temperature. A greenish yellow pigment is obtained having excellent pigment properties and much higher color strength when incorporated into paints or plastics in comparison to the starting material. In comparison to a commercial C.I. Pigment Yellow 109 (IRGAZIN Yellow 2GLTN-from CIBA-GEIGY AG), the product obtained according to Example 5 shows a much stronger masstone color by rubout performed according to ASTM-method D-387-60.

EXAMPLE 6

Example 4 is repeated except that an azo condensation pigment, crude C.I. Pigment Yellow 93, is used instead of indanthrone blue and the premilled powder is stirred for 2 hours in dimethylsulfoxide at room temperature. A yellow pigment is obtained exhibiting higher color strength compared to the source material with excellent pigment properties. In comparison to a commercial C.I. Pigment Yellow 93 (CHROMOPHTAL Yellow 3G), the product shows higher color strength and equivalent fastness properties.

EXAMPLE 7

Example 4 is repeated, except that the dioxazin violet crude C.I. Pigment Violet 37 is used instead of indanthrone blue and the premilled powder is stirred for 5 hours in dimethylsulfoxide at room temperature. A violet pigment is obtained which exhibits much higher color strength and saturation compared to the starting material and which is comparable to a commercial C.I. Pigment Violet 37 such as CROMOPHTAL Violet B (CIBA-GEIGY AG) in its excellent pigment properties.

EXAMPLE 8

Example 4 is repeated except that the perylene pigment crude C.I. Pigment Red 179 is used instead of indanthrone blue. A red pigment is obtained with much higher color strength as compared to the starting material and with comparably excellent pigment properties when incorporated into paints and plastics relative to a commercial C.I. Pigment Red 179.

EXAMPLE 9a

A ball mill having the capacity of about 1 liter, containing 1.5 kg steel balls (diameter: 1.2 cm) and 150 grams nails (length: 3 cm) as grinding bodies is charged with 50 grams gamma quinacridone pigment crude and 12.5 grams of anhydrous sodium sulfate. The sealed mill is rotated for 72 hours on a roll mill at room temperature. The mill powder is then separated from the grinding media.

EXAMPLE 9b

A flask is charged with 130 ml N,N-dimethylformamide, 13 grams of the above described gamma-quinacridone premilled powder and 0.2 grams of quinacridonemonosulfonic acid as a particle growth inhibitor. The suspension is stirred at room temperature for 2 hours (25°-28° C.) and the pigment is isolated by filtration. The presscake is washed with methanol and reslurried in 300 ml water, 2.0 ml concentrated sulfuric acid are added and the pigment suspension is stirred for 1 hr. at 70°-80° C. to extract any iron powder generated in the premilling operation. The pigment is filtered off, the presscake washed with hot water until salt and acid free and then dried. The pigment shows excellent color and weatherfastness properties upon incorporation into a conventional system.

EXAMPLE 9c

Example 9b is repeated except that 0.5 grams of quinacridone-monosulfonic acid is used as the particle size inhibitor providing a smaller particle size pigment with high color strength, greater transparency and excellent fastness properties similar to MONASTRAL Red RT-796-D, a commercial gamma-quinacridone from CIBA-GEIGY AG, when applied as a paint system.

EXAMPLE 10

Example 9a is repeated using a mixture of 60% gamma-quinacridone and 40% 2,9-dichloroquinacridone crude in place of the gamma-quinacridone crude. Submitting the resulting premilled powder to a N,N-dimethylformamide treatment as described in Example 9b, a quinacridone solid solution pigment is formed whose X-ray diffraction pattern differs from the X-ray diffraction pattern of the corresponding physical mixture of the above mentioned starting materials. This solid solution pigment produces very strong bluish-red colorations having excellent intensity and fastness properties when incorporated into plastics and paints.

EXAMPLE 11

Example 9a is repeated using a mixture of 60% 2,9-dichloroquinacridone crude and 40% 3,6 di(4-chlorophenyl)-1,4-diketopyrrolo-[3,4-c]-pyrrole in place of the gamma-quinacridone crude. Upon submitting the resulting premilled powder to a N,N-dimethylformamide treatment at room temperature for 4 hours without the use of a particle growth acid inhibitor, a quinacridone-diketopyrrolopyrrole solid solution pigment is formed whose X-ray diffraction pattern differs from the X-ray diffraction pattern of the corresponding physical mixture of the above mentioned starting materials. This solid solution pigment produces very strong bluish-red colorations of excellent fastness properties in plastics and paints.

EXAMPLE 12

A mixture of 130 grams of steatite balls of 8 mm in diameter, 47.5 grams of alkyd melamine baking finish consisting of 60 grams of alkyd resin (BECKOSOL 27-320 from Reichhold Chemie AG) 60% in xylene, 36 grams of melamine resin (SUPER-BECKAMIN 13-501 from Reichhold Chemie AG) 50% in xylene:butanol (2:1 mixture), 2 grams of xylene, 2 grams of ethylene glycol monomethyl ether and 2.5 grams of the pigment obtained in Example 4 is dispersed in a 200 ml capacity glass flask with a twist-off cap on a roll stand in the course of 120 hours. After the steatite balls have been separated, 2.4 grams of the full tone mixture thus dispersed is mixed with 60 grams of titanium dioxide (KRONOS 59 from Kronos Titan GmbH) and a further 24.0 grams of the above described alkyd melamine baking finish. The mixture thus obtained is sprayed onto aluminum panels and subsequently baked at 130° C. for 30 minutes. This resulting blue finish shows excellent fastness properties.

EXAMPLE 13

A mixture of
130 grams of steatite balls (diameter: 8 mm)
45.5 grams of a thermosetting acrylic finish consisting of
    41.3 grams of acrylic resin (VIACRYL VC 373, 60%, from VIANOVA Kunstharz AG),
    16.3 grams of melamine resin (MAPRENAL TTX, 55%, from HOECHST AG),
    32.8 grams of xylene,
    4.6 grams of ethylglycol acetate
    2.0 grams of butyl acetate and
    1.0 grams of 'Siliconöil A, 1% in xylene (BAYER AG), and
2.5 grams of the pigment obtained in Example 9c is dispersed in a 200 ml glass flask with a twist-off seal on a roll stand in the course of 72 hours. The steatite balls are separated and 8.0 grams of the millbase, 0.6 grams of aluminum paste (ALCOA, 60–65% Al content, Aluminum Corp. of America), 1.0 grams of methyl ethyl ketone and 18.4 grams of the above mentioned thermosetting acrylic finish are thoroughly mixed and the resulting mixture is sprayed onto aluminum panels and subsequently baked at 130° C. for 30 minutes. Very strong red metallized coatings having excellent fastness properties are obtained.

EXAMPLE 14

A mixture of 1.0 grams of the pigment obtained in Example 6, 1.0 grams of antioxidant (IRGANOX 1010 from CIBA-GEIGY AG) and 1000 grams of polyethylene HD granules (VESTOLEN A 60-16, HUELS) is charged into a glass flask on a roll stand and premixed for 15 minutes. The mixture is then extruded in two passes on a single shaft extruder and the granules thus obtained are injection molded at 220° C. in an injection molding machine (Allround Arburg 200) into sheets which are subsequently compressed at 180° C. for 5 minutes. The pressed sheets have strong yellow shades with excellent fastness properties.

EXAMPLE 15

A mixture of 0.6 grams of the pigment obtained in Example 2, 67 grams of polyvinyl chloride, 33 grams of dioctyl phthalate, 2 grams of dibutylin dilaurate and 2 grams of titanium dioxide, is processed in a roll mill over 15 minutes at 160° C. into a thin sheet. The orange PVC sheet thus produced is very deeply colored and is fast to migration and light.

EXAMPLE 16

1000 grams of polypropylene granules (DAPLEN PT-55, Chemie LINZ) and 20 grams of a 50%, by weight, pigment preparation consisting of 10 grams of the pigment obtained in Example 5 and 10 grams of magnesium behenate are thoroughly mixed in a mixing drum. The granules thus treated are melt-spun at 260° to 285° C. Yellow fibers having very good light and textile fastness properties are obtained.

EXAMPLE 17

This example illustrates the incorporation of the diphenyl-diketopyrrolopyrrole pigment obtained according Example 1 into high solids enamels.

Pigment Dispersion Formulation

A 0.26 liter jar is charged with 42.2 grams of the pigment prepared according to Example 1, followed by 66.0 grams of acrylic resin, 57.5 grams of xylene and 980 grams of 4 mm diameter steel diagonal rods. The mixture is milled in the jar for 64 hours on a roller mill. The dispersion contains 28% pigment and 56% solids at a pigment to binder ratio of 1.0.

Catalyst and Stabilizer Solution Formation

A 4.2 liter jar fitted with an impeller stirrer is charged with 755 grams ethyl acetate, 1177 grams UV-screener solution (contains benzotriazole UV absorber-TINUVIN 1130 from CIBA-GEIGY Corp.) and 47.9 grams of an amine solution (N-propylamine in xylene, methanol, butanol). A mixture of 34.8 grams methanol and 113.8 grams dodecylbenzenesulfonic acid is added and the resulting solution is stirred for 20 minutes.

Paint Formulation 36.2 grams of above described Pigment Dispersion, 39.6 grams of acrylic resin, 28.4 grams of melamine resin and 20.8 grams of the Catalyst and Stabilizer Solution are mixed and diluted with xylene to a spray viscosity of 13-17 seconds using No. 4 FORD cup. The paint (masstone) is sprayed onto a primed aluminum panel, exposed to ambient air for 10 minutes and stoved for 30 minutes at 130° C.

The orange colored coating so obtained exhibits excellent weatherability. In comparison to a coating prepared in a similar manner but using the crude starting material 3,6-diphenyl-1,4-diketopyrrolo-[3,4-c]-pyrrole as pigment, the coating reflecting the instant invention shows higher opacity, higher color strength and much higher saturation as demonstrated by the following instrumental color readings obtained on a spectrophotometer using D65 illuminant, C.I.E. lab scale and 10 degree observer with specular component included (expressed in L,A,B color space values).

| 3,6-diphenyl-1,4-diketo-pyrrolopyrrole | L | A | B | ΔE |
|---|---|---|---|---|
| According to Example 1 | 46.5 | 51.4 | 34.1 | 5.8 |
| Starting material | 43.5 | 48.2 | 30.3 | — |

The major appearance change (ΔE) is due to higher saturation and a hue shift. The product of Example 1 is yellower than the starting material, reflected by the B value being more positive by 3.8 units. There is also a lightness difference wherein the starting material is darker, demonstrated by a 3.0 unit difference in the L values. In addition, the A value for Example 1 relative to the starting material is 3.2 units higher, thus illustrating much higher intensity or brightness.

In summary, it is seen that this invention provides a new conditioning process for converting crude pigments into pigmentary form. Variations may be made in proportions, procedures and materials without departing from the scope of the invention as defined by the following claims.

What is claimed is:

1. A process for converting a crude organic pigment into pigmentary form consisting essentially of premilling the crude pigment, contacting the premilled pigment with a polar organic solvent at a temperature below about 50° C. for a period of time sufficient to obtain pigmentary particle size and isolating the pigmentary form.

2. The process of claim 1, wherein said organic pigment is selected from the group consisting of diketopyrrolopyrroles, perylenes, unsubstituted quinacridones, substituted quinacridones, phthalocyanines, perinones, isoindolinones, indanthrone, dioxazines, anthraquinones, isoindolines, flavanthrones, pyranthrones, thioindigos, solid solutions containing two or more of these pigment moieties and azo pigments.

3. The process of claim 2, wherein said organic pigment is selected from the group consisting of unsubstituted quinacridone, substituted quinacridones, quinacridone solid solutions, diketopyrrolopyrroles, quinacridone/diketopyrrolopyrrole solid solutions, anthraquinones, isoindolines, dioxazines and azo pigments.

4. The process of claim 2, wherein said organic pigment is selected from the group consisting of diketopyrrolopyrroles, indanthrone, isoindolinones, azo pigments, dioxazines, perylenes, gamma-quinacridone, quinacridone/2,9-dichloroquinacridione solid solution and 2,9-dichloroquinacridone/diketopyrrolopyrrole solid solution.

5. The process of claim 1, wherein said polar organic solvent is selected from the group consisting of N,N-dimethylformamide, N,N-dimethylacetamide, N,N,N',N'-tetramethylurea, N-methylpyrrolidone, N-methylformamide, tetramethylene sulfone and dimethylsulfoxide.

6. The process of claim 5, wherein said polar organic solvent is N,N-dimethylformamide or dimethylsulfoxide.

7. The process of claim 6, wherein said polar organic solvent is dimethylsulfoxide.

8. The process of claim 1, wherein said polar organic solvent is present in an amount of from 5 to 20 times the weight of premilled pigment.

9. The process of claim 1, wherein said contacting temperature is from 10°-40° C.

10. The process of claim 9, wherein said contacting temperature is from 20°-28° C.

11. The process of claim 1, wherein an effective particle growth inhibition amount of a pigment particle growth inhibitor is added to the premilled pigment/polar organic solvent mixture.

12. The process of claim 11, wherein said pigment particle growth inhibitor is a sulfonic acid, phthalimidomethyl-, imidazolylmethyl-, pyrazolylmethyl or dialkylaminoalkylsulfonamide derivative of the organic pigment.

13. The process of claim 12, wherein said particle growth inhibitor is quinacridone-monosulfonic acid.

14. The process of claim 11, wherein said particle growth inhibitor is present in a concentration of from 0.05 to 15%, based on the weight of the crude pigment.

* * * * *